FIG_1

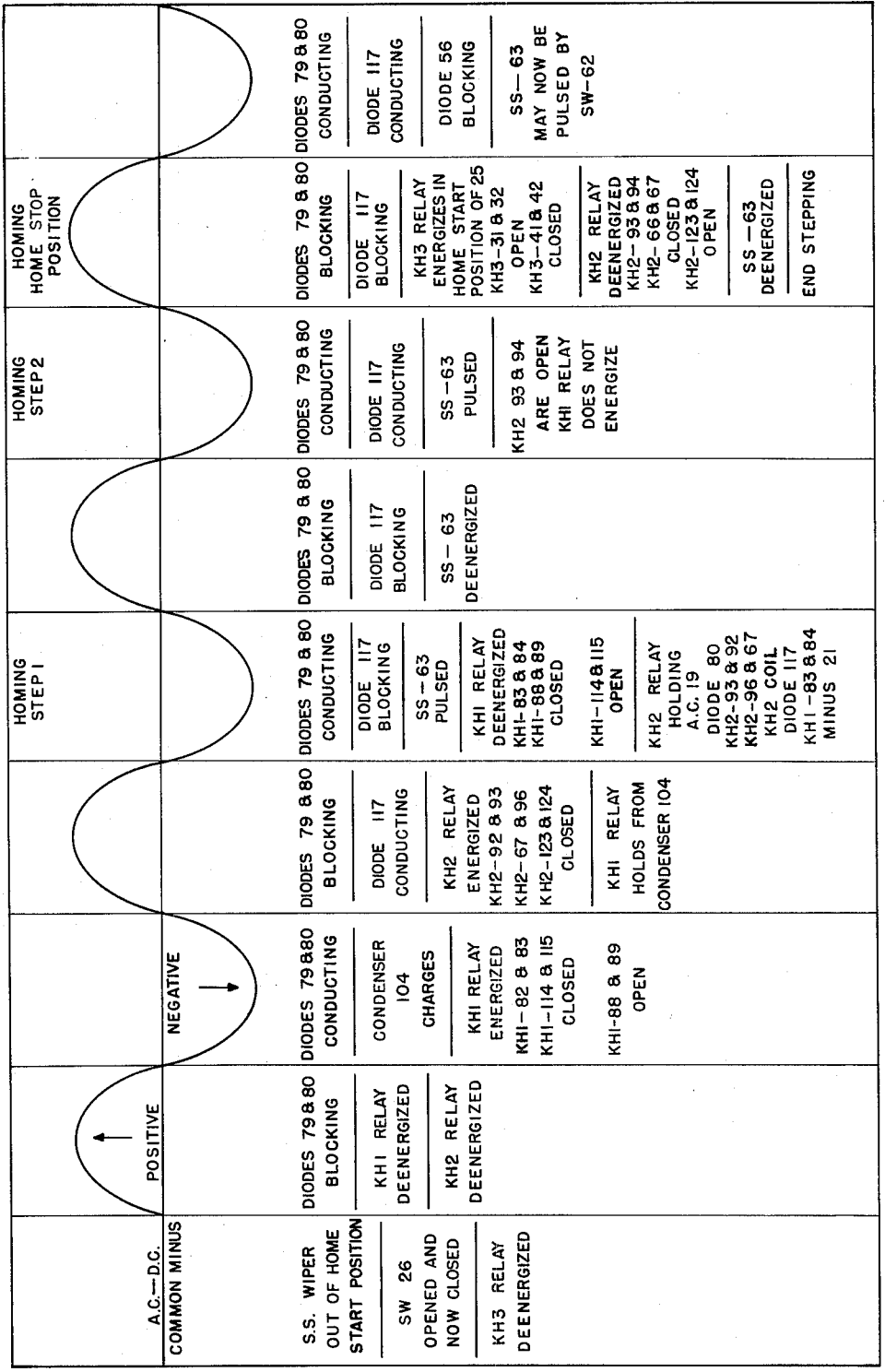
FIG_3

United States Patent Office 3,229,125
Patented Jan. 11, 1966

3,229,125
CONTROL SYSTEM FOR A STEPPING SWITCH
David J. Deeks, Alameda, Calif., assignor, by mesne assignments, to Friden, Inc., San Leandro, Calif., a corporation of Delaware
Filed Aug. 29, 1962, Ser. No. 220,204
5 Claims. (Cl. 307—112)

This invention relates to a homing system and more particularly to an alternating current pulse drive and associated timing circuitry for application with either a conventional unidirectional or bidirectional stepping switch.

It is well known that in conventional systems of homing, such as self-interrupting devices, that precise adjustment of the interrupter contacts is necessary from time to time, occasioned by mechanical deviation and wear and also by contact erosion due to arcing.

Since mechanical variables and electrical pulse lengths are interrelated, the mechanical variables will affect the electrical pulse lengths and vice versa. An unstable condition exists, therefore, wherein only partial stepping may occur, resulting in incorrect positioning and rapid ratchet wheel wear and a subsequent failure of the stepping switch. It is, therefore, an object of the present invention to provide an improved homing system for a stepping switch whereby precise pulse spacing and amplitude effect a mechanical rhythm for accurate step-by-step movement of the stepping switch.

Another object of the present invention is to provide a homing system for stepping switches which will eliminate the use of interrupter contacts.

Another object of the present invention is to provide an improved homing system for a stepping switch which will enable substantially arc-free relay operation.

A further object of the present invention is to provide an improved control system for a stepping switch to effect a precise starting and stopping operation of the switch.

Other objects and advantages will become apparent from the following description of a preferred embodiment as illustrated in the accompanying drawings, in which:

FIG. 3 is a diagrammatic showing of the alternating current cyclic control timing chart.

Figure 1:
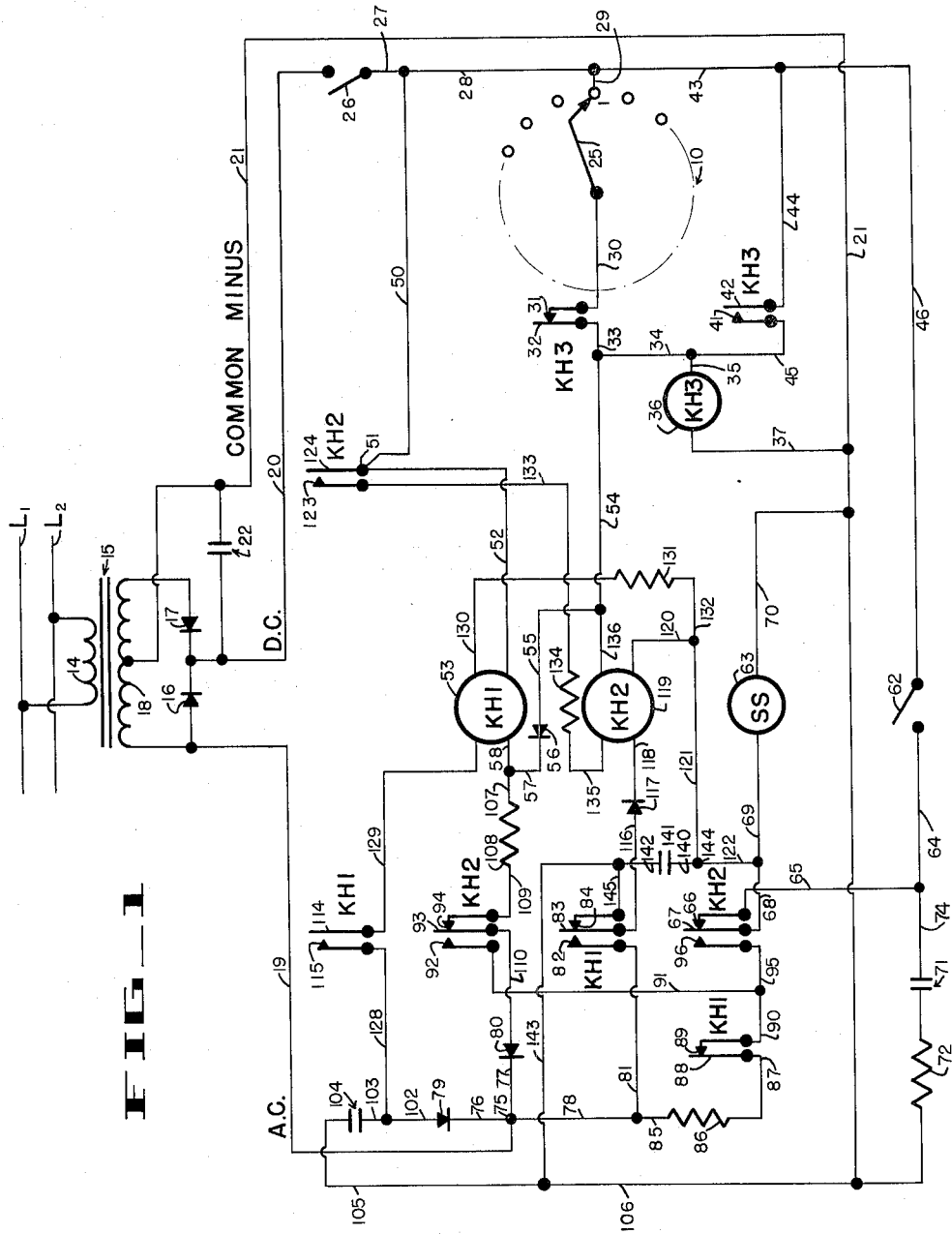
FIG. 1 is a circuit diagram of a preferred embodiment of the present invention for the control of a unidirectional stepping switch.
Figure 2:
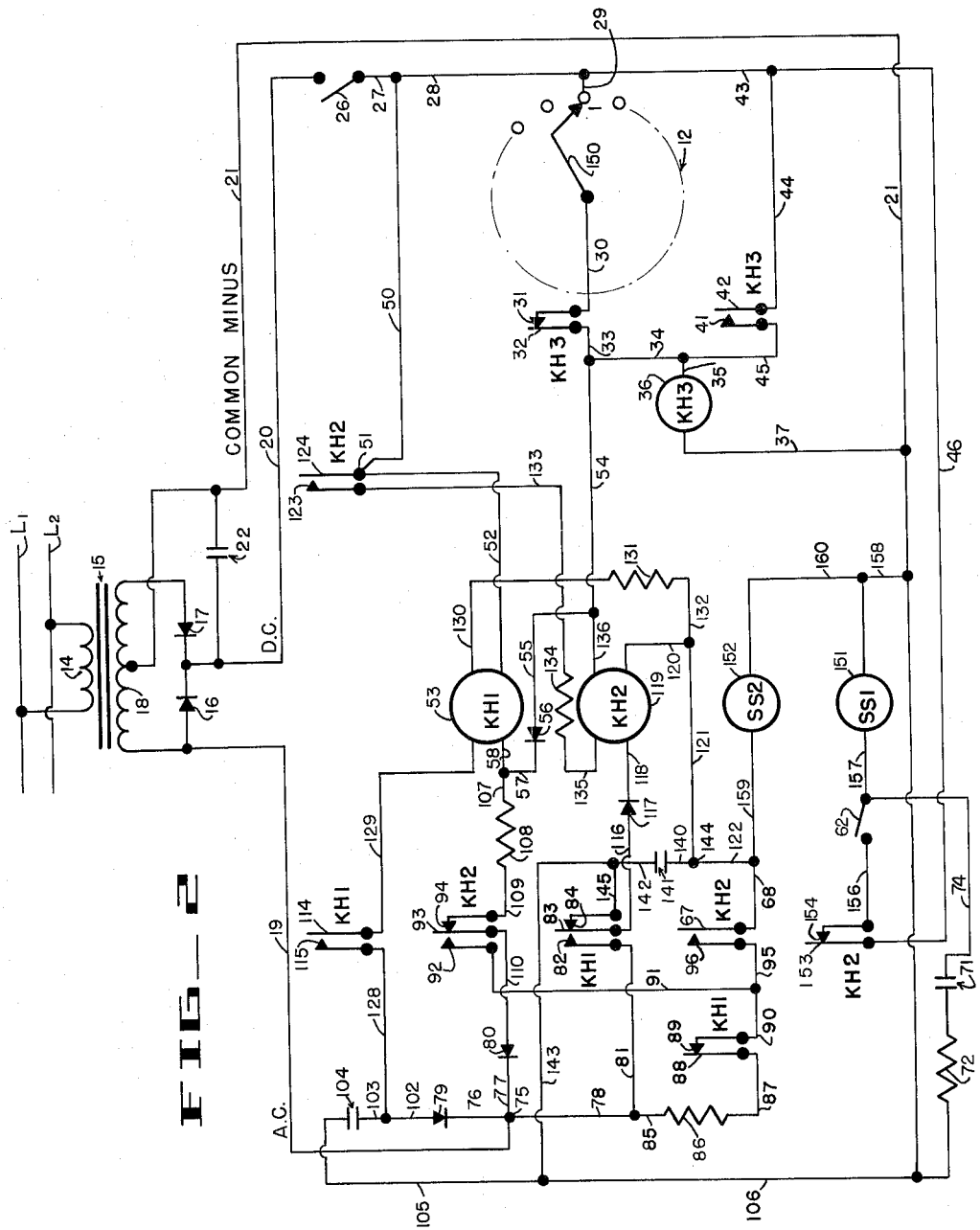
FIG. 2 is a circuit diagram of a preferred embodiment of the present invention for the control of a bidirectional stepping switch.

Referring to FIG. 1, a conventional unidirectional stepping switch is generally indicated at 10 while a conventional bidirectional stepping switch is generally indicated at 12 in FIG. 2. In the embodiment of the invention illustrated in FIGS. 1 and 2, each of the stepping switches 10 and 12 is shown diagrammatically as having one level of seventeen positions. It will be understood, however, that similar switches may be used having any desired number of levels and positions without departing from the scope of the invention.

The power supply for the circuits in FIGS. 1 and 2 comprises the primary winding 14 of a transformer 15 connected across a suitable source of alternating current, such as conductors $L_1$ and $L_2$. A full wave rectifier, including diodes 16 and 17, is connected across the output terminals of the secondary winding 18 of transformer 15, providing an A.C. output conductor 19 and a D.C. output conductor 20. A center tap of the transformer secondary winding 18 provides a common minus conductor 21 for both the A.C. and D.C. output conductors 19 and 20, respectively.

While the stepping switch 10 has been shown diagrammatically in FIG. 1 as having but a single home position indicated by the numeral 1, it is to be noted that a series of home positions may be provided, each of which will be sensed in a manner similar to that now to be described. In order to effect a step-by-step operation of wiper 25 of stepping switch 10 to a selected position from the home position indicated at "1" in FIG. 1, circuit energizing switch 26 is closed to complete the D.C. input to the home contact "1" by means of conductor 20, closed switch 26, conductor 27, conductor 28 and conductor 29. From the contact "1", voltage passes through wiper 25, conductor 30, closed contacts 31, 32, and conductors 33, 34 and 35 to the coil KH3 relay 36, the circuit being completed to the minus common conductor 21 through conductor 37. Upon energization thereof, KH3 relay 36 becomes effective to open contacts 31, 32 and to close contacts 41, 42, thereby providing a sealed circuit for relay 36 by way of D.C. input conductor 20, closed switch 26, conductors 27, 28, 43 and 44, closed contacts 42, 41 and conductors 45 and 35, to the coil of the relay 36.

Upon closure of switch 26, voltage also passes from D.C. input conductor 20 through switch 26, conductors 27 and 50, terminal 51 and conductor 52 to one side of KH1 relay 53. Following the closure of contacts 41, 42, upon energization of KH3 relay 36, a circuit is completed from D.C. input conductor 20 through switch 26, conductors 27, 28, 43 and 44, closed contacts 42, 41, conductors 45, 34, 54 and 55 through diode 56 and conductors 57, 58 to the other side of KH1 relay 53. Inasmuch as an equal potential exists on both sides of KH1 relay 53, this relay will not be energized.

For the step-by-step operation of the wiper 25 of stepping switch 10, a repeated closing and opening of switch 62 is effected to cause intermittent energization of SS stepping switch coil 63, a circuit being completed from the D.C. input conductor 20, closed switch 26, conductors 27, 28, 43 and 46, switch 62, conductors 64 and 65, closed contacts 66, 67 and conductors 68 and 69 to switch coil 63, returning via conductor 70 to minus common conductor 21. An arc suppression combination of a condenser 71 and resistor 72 is provided in line 74 for the stepping action initiated by operation of switch 62. Immediately following step-by-step movement of the wiper 25 of stepping switch 10 to a desired position, switch 26 is opened, thereby causing de-energization of KH3 relay 36, which then becomes effective to close contacts 31 and 32 and to open contacts 41 and 42. The system is now in condition for a stepping switch homing operation.

If, at the instant of closing of switch 26, to initiate a homing operation, the positive voltage portion of the A.C. cycle exists at the junction 75 of the A.C. input conductor 19 with conductors 76, 77 and 78, voltage will be restricted by diodes 79 and 80, but will pass through conductors 78 and 81, to be restricted by open contacts 82 and 83. Similarly, voltage may flow through conductors 78 and 85, resistor 86, conductor 87, closed contacts 88 and 89, conductors 90 and 91, to be restricted by open contacts 92 and 93. Likewise, the positive voltage of the A.C. cycle occurring at junction 75 will pass through conductors 78 and 85, resistor 86, conductor 87, closed contacts 88 and 89, conductors 90 and 95, terminating at open contacts 96 and 67. However, immediately upon transfer of the voltage from the positive portion to the negative portion of the A.C. cycle, diode 79 is conductive, so that voltage passes from A.C. input conductor 19 to conductor 76, through diode 79, conductors 102 and 103 to condenser 104, charging condenser 104 to a negative potential with respect to the minus common conductor 21, the return path for condenser 104 being conductors 105 and 106 to conductor 21. Also at this time, voltage from the D.C. input conductor 20 causes energization of KH1 relay 53 by way of closed switch 26, conductors 27 and 50, terminal 51, conductor 52 to relay 53, conductors 58 and 107, resistor 108, conductor 109, closed contacts 94 and 93, conductor 110 through conductive diode 80, conductor 77 and junction 75 to A.C. conductor 19. Relay 53 becomes effective upon energization thereof to close contacts 114, 115 and contacts 82, 83 and to open contacts 88, 89.

As the voltage passes from the negative portion of the A.C. cycle to the positive portion thereof, the KH2 relay 119 becomes energized as the voltage passes from A.C. input conductor 19, through junction 75, conductors 78 and 81, closed contacts 82, 83, conductor 116 through conductive diode 117 and conductor 118 to one side of relay 119, returning by way of conductors 120 and 121, junction 144, conductors 122 and 69 through the stepping switch coil 63 and conductor 70 to minus common conductor 21. The KH2 relay 119 serves upon energization thereof to immediately close contacts 92 and 93, 96 and 67 and 123, 124. Each of the relays KH1 (53) and KH2 (119) is maintained in an energized state, relay 53 being held by energy supplied from the negative charge in condenser 104, passing through conductors 103 and 128, closed contacts 115, 114 and conductor 129 to one side of relay 53. From the other side of the relay 53, voltage passes through conductor 130, resistor 131, conductors 132 and 121, junction 144, conductors 122 and 69 through stepping switch coil 63 and conductor 70 to minus common conductor 21. The positive side of condenser 104 is connected to conductor 21 through conductors 105 and 106. For the retention of relay KH2 (119) in its energized condition, voltage is supplied from D.C. conductor 20, closed switch 36, conductors 27 and 50, terminal 51, closed contacts 124, 123, conductor 133, resistor 134, conductor 135 to relay 119, returning by way of conductors 136, 54, 34 and 35 through KH3 relay 36 and conductor 37 to minus common conductor 21. In order to preclude the possibility of chatter in each of the relays, a ripple filter 22 is provided connected across D.C. input conductor 20 and minus common conductor 21. It is to be noted that the choice of coil resistance for relay 119 is such that the voltage across the coil of relay 36 is not sufficient to energize the coil. This is further enhanced by the current limiting resistor 134.

The circuit is now in condition to effect the initial homing step pulse of the stepping switch coil 63 as the voltage enters the negative portion of the A.C. cycle. Each of the diodes 79 and 80 is now in a conducting position with diode 79 enabling a recharging of condenser 104 to a negative potential, as explained bove. At the same time, energy is supplied from the A.C. input conductor 19 through junction 75, conductor 77, diode 80, conductor 110, closed contacts 93, 92, conductors 91 and 95, closed contacts 96, 67, and conductors 68 and 69 to one side of stepping switch coil 63 and from the other side of the coil through conductor 70 to minus common conductor 21. Thus, stepping switch coil 63 is energized, advancing the stepping switch wiper 25 one step toward the home position. Also at this time, negative voltage is supplied from the junction 75 through conductor 77, diode 80, conductor 110, closed contacts 93, 92, conductors 91 and 95, closed contacts 96, 67, conductors 68, 22, junction 144, conductor 140 to condenser 141, thereby charging condenser 141 to a negative potential, returning by way of conductors 142, 143 and 106 to minus common conductor 21. Taken from the junction 144, the negative voltage also passes via conductors 121 and 132, resistor 131, and conductor 130 to one side of KH1 relay 53. The relay 53 now becomes de-energized, since a negative voltage exists at both terminals thereof, the other negative voltage circuit being traceable from A.C. conductor 19, junction 75 and conductor 76 through diode 79, conductors 102 and 128, closed contacts 115, 114 and conductor 129 to the other side of the relay 53. Upon de-energization, relay KH1 (53) becomes effective to open contacts 114 and 115 and to close contacts 83, 84 and contacts 88, 89.

Certain mechanical configurations of the wiper 25 of the one of the stepping switch levels controlling the homing operation may provide bridging which might be effective to cause an untimely relay releasing for the last stepping action during a homing operation. This would cause premature de-energization of the KH2 relay 119, thereby transferring contacts 67 and 93 to the position shown in FIG. 1 with a resulting short pulsing of the stepping switch coil 63. Therefore, a holding circuit is provided for the KH2 relay 119, which becomes effective during the negative portion of the A.C. cycle and constitutes A.C. input conductor 19, conductor 77, diode 80, conductor 110, closed contacts 93, 92, conductors 91 and 95, closed contacts 96, 67, conductors 68, 122, junction 144, conductors 121 and 120 to relay 119, returning by way of conductor 118, diode 117, conductor 116, closed contacts 83, 84, and conductors 145, 143 and 106 to minus common conductor 21.

Following completion of the negative portion of the A.C. cycle and the inception of the positive portion of the cycle, voltage input from A.C. conductor 19 is restricted by nonconductive diodes 79 and 80 and open contacts 82 and 83, but is carried by way of conductors 78 and 85, through resistor 86, conductor 87, closed contacts 88, 89, conductors 90 and 95, closed contacts 96, 67 and conductors 68 and 69 to stepping switch coil 63, returning through conductor 70 to minus common conductor 21, thereby effecting de-energization of the stepping switch coil 63. The resistor 86 is so proportioned that the positive voltage provided thereby is just sufficient to ensure a rapid decay of the magnetic field of the stepping switch coil 63, whereby preparation of the coil 63 for the succeeding operating negative pulse is ensured.

During the ensuing negative half of the A.C. cycle, diodes 79 and 80 are conductive and although these diodes are in a conductive state, KH1 relay 53 will not be energized since contacts 93 and 94 are open. Likewise, even though condenser 104 is charged to a negative potential, the holding circuit for relay 53 will remain ineffective because of open contacts 114 and 115. At this time, however, negative voltage will be carried via conductor 77 from A.C. input conductor 19, through diode 80, conductor 110, closed contacts 93, 92, conductors 91 and 95, closed contacts 96, 67, conductors 68 and 69 to one side of stepping switch coil 63, from the other side of coil 63 through conductor 70 to minus common conductor 21. Thus, stepping switch coil 63 is energized to effect the second step of movement of wiper 25 toward the home position. At the same time, negative voltage passes through conductor 122, junction 144 and conductor 140 to provide condenser 141 with a negative potential, returning via conductors 142, 143 and 106 to minus common conductor 21. Negative voltage is also taken from junction 144, carried by conductors 121 and 120 to KH2 relay 119, returning via conductor 118, diode 117, conductor 116, closed contacts 83, 84 and conductors 145, 143 and 106 to minus common conductor 21, providing a sealed circuit for KH2 relay 119, as explained above.

For each succeeding step of movement of wiper 25 of stepping switch 10 toward the home position, the circuits will function in a manner identical to that described above in connection with the A.C. cyclic control of the second step of movement effected by stepping switch coil 63.

Referring to FIG. 3, it will be noted that each homing stepping action takes place during the negative portion of each A.C. cycle and that upon pulsing of the stepping switch coil 63 to move the wiper 25 of stepping switch 10 from the penultimate position into the home position indicated by numeral 1 (FIG. 1), voltage passes from the negative portion of that cycle into the positive portion of the cycle. As it is explained, the entire homing operation commences with the negative portion of a cycle and terminates with the positive portion of a corresponding cycle.

As wiper 25 of stepping switch 10 moves into the home position, KH2 relay 119 will have eight milliseconds in the positive portion of the cycle to de-energize (base on a 60-cycle rate). This de-energization is occasioned by a positive voltage occurring at both sides of KH2 relay 119, passing from D.C. input conductor 20 through closed switch 26, conductors 27 and 50, junction 51, closed contacts 124, 123, conductor 133, resistor 134 and conductor 135 to one side of the relay, and from input conductor 20 through closed switch 26, conductors 27, 28 and 29, through wiper 25, conductor 30, closed contacts 31, 32, conductors 33, 54 and 136 to the other side of the relay 119. Upon de-energization of KH2 relay 119, contact 67 will transfer, closing contacts 66, 67, contact 93 will transfer to close contacts 93, 94, and contacts 123 and 124 will be opened. Since a small amount of voltage will flow from A.C. input conductor 19, junction 75, conductors 78 and 85, through resistor 86, conductor 87, closed contacts 88, 89, conductors 90 and 95, closed contacts 96, 67, conductors 68 and 69 to stepping switch coil 63, prior to the de-energization of relay 119, condenser 141 becomes effective via conductors 122 and 140 to suppress such voltage generated by the collapsing magnetic field of the stepping switch coil 63.

When a homing operation involves only a single stepping pulse of SS coil 63 to move wiper 25 of stepping switch 10 into the home position, low inertia aggravates the possibility of short pulsing. This condition, however, is avoided by the seal circuit adapted for use in connection with KH2 relay 119, the seal circuit holding with the stepping pulse during the negative portion of the A.C. cycle and releasing only during the positive half of the cycle.

As wiper 25 of stepping switch 10 moves into the home position indicated by the numeral 1 (FIG. 1), KH3 relay 36 becomes energized concurrent with the de-energization of KH2 relay 119. Contacts 31 and 32 are now open and contacts 41 and 42 are closed, the closed contacts 41 and 42 providing the seal circuit to maintain relay 36 in an energized state. With the closing of contacts 41 and 42, positive voltage is supplied to one side of each of relays KH1 (53) and KH2 (119). However, neither relay becomes energized by virtue of the fact that a positive voltage is supplied to the other side of KH1 relay 53 and the return circuit to the other side of KH2 relay 119 is broken at open contacts 123 and 124. The system is now again conditioned for pulsing of the SS coil 63 to advance wiper 25 of stepping switch 10 from the home position to a selected position by the repetitive closing and opening of switch 62.

In the embodiment of the invention shown in FIG. 2 a stepping switch of the conventional bidirectional type is indicated at 12. In this type of stepping switch, each wiper arm 150 of the various levels is stepped selectively in one direction to a desired position, upon the pulsing of SS1 stepping switch coil 151, and is then returned in the opposite direction to the home position indicated by the numeral 1, upon pulsing of SS2 stepping switch coil 152. The circuitry involved in each of the systems shown in FIGS. 1 and 2 is identical, except for the provision of the two stepping coils 151 and 152 and the separate circuit control for each coil. It will be noted that like circuits and components included in each of these systems are identifiable by the same reference characters.

It will be noted further that the KH2 switch contact 66 in FIG. 1 is eliminated in FIG. 2, but is replaced by KH2 switch contacts 153 and 154 which serve the same function upon opening and closing as contacts 66 and 67 in FIG. 1.

Referring to FIG. 2, the pulsing of the SS1 stepping switch coil 151 is under the control of the repetitive closing and opening of switch 62, following the closure of switch 26, and the circuit is traceable from the D.C. input conductor 20 through closed switch 26, conductors 27, 28, 43 and 46, closed contacts 153, 154, conductor 156, closed switch 62 and conductor 157 to stepping coil 151, through conductor 158 to minus common conductor 21. Pulsing of the coil 151 is effective to move wiper 150 in one direction and in step-by-step fashion from the home position indicated by the numeral 1. During each homing operation, as outlined in FIG. 3, the energization of KH2 relay 119 becomes effective to close contacts 67, 96, thereby opening contacts 66, 67 in FIG. 1 to prevent an inadvertent pulsing of SS coil 63 by switch 62 during a homing operation. Referring now to FIG. 2, the energization of KH2 relay 119 functions in the same manner to effect the closing of contacts 67, 96 and also functions to open contacts 153 and 154, thereby disabling the use of switch 62 for the inadvertent pulsing of stepping switch 151.

The homing circuit shown in FIG. 2 for controlling the pulsing of SS2 stepping switch coil 152 to return wiper 150 of stepping switch 12 to the home position is identical to the circuit shown in FIG. 1 and explained hereinbefore. Following the energization of KH2 relay 119 for a homing operation as described above, contacts 92, 93 and contacts 67, 96 are closed while contacts 153 and 154 are opened. Upon closure of contacts 92, 93 and contacts 67, 96, voltage is supplied during the negative portion of the A.C. cycle from A.C. conductor 19, junction 75, conductor 77, diode 80, conductor 110, closed contacts 93, 92, conductors 91 and 95, closed contacts 96, 67, conductors 68 and 159 to SS2 step switch coil 152 returning via conductors 160 and 158 to minus common conductor 21.

As described above, the KH1 relay 53 is energized during the negative half of an A.C. cycle to enable the energization of KH2 relay 119 in the positive half of the same cycle. The energization of the KH2 relay 119 then becomes effective to cause pulsing of the SS coil 63 in the negative half of the next succeeding A.C. cycle and in the negative half of each succeeding cycle. This sequence continues until the wiper 25 homes in the negative half of the last cycle.

I claim:

1. In a combination with a stepping switch, a series of contacts on said stepping switch, a wiper movable from a home position for sequential engagement with selective ones of said contacts, a stepping switch coil for moving said wiper, an A.C. source of power supply and a D.C. source of power supply, a circuit means normally ineffective to supply input signals to said stepping switch coil to move said wiper from a selected contact position to a home position, a first electrical control means and a second electrical control means, a switch means for enabling operation of said first electrical control means from said D.C. source of supply, means controlled by said first electrical control means for enabling operation of said second electrical control means from said A.C. source of supply, means rendered operable by said second electrical control means upon operation thereof to connect said circuit means with said A.C. source of supply and to disable said first electrical control means, and a circuit connectable by said wiper in the home position thereof operable to disable operation of said second electrical control means.

2. In a combination with a stepping switch, a series of contacts on said stepping switch, a wiper movable from a home position for sequential engagement with selective ones of said contacts, a stepping switch coil for moving said wiper, an A.C. source of power supply, a full wave rectifier for providing a D.C. power supply from said A.C. source of supply, a first electrical control means, a switch means for controlling energization of said first electrical control means from said D.C. source of supply and a holding circuit for said first electrical control means including a condenser, a second electrical control means for controlling the application of energy from said A.C. source of supply to said stepping switch coil for movement of said wiper to home position and to effect de-energization of said first electrical control means, said first electrical control means operable upon energization thereof to control the energization of said second electrical control means, a locking circuit controlled by the de-energization of said first electrical control means operable to maintain said second electrical control means energized subsequent to the de-energization of said first electrical control means, and means energized by said wiper upon return of the wiper to home position operable to effect de-energization of said second electrical control means.

3. In a combination with a stepping switch, a wiper on said stepping switch, a stepping coil for moving said wiper step-by-step from a selected position to a home position, an A.C. source of power supply, a first electrical control means operable upon energization to connect said stepping coil with said A.C. source of supply effecting pulsing of the stepping coil in alternate portions of each A.C. cycle, a second electrical control means operable upon energization to effect energization of said first electrical control means in a predetermined portion of the initial A.C. cycle, a switch means for controlling energization of said second electrical control means, said first electrical control means operable upon energization thereof to control de-energization of said second electrical control means in the alternate portion of the A.C. cycle succeeding the initial A.C. cycle, a locking circuit enabled by said second electrical control means upon de-energization thereof to maintain said first electrical control means in an energized state until said wiper reaches home position, and a circuit means effective upon return of said wiper to home position to cause de-energization of said first electrical control means in the opposed portion of the last homing A.C. cycle.

4. In a combination with a stepping switch, a wiper on said stepping switch, a stepping coil for moving said wiper step-by-step from a selected predetermined position to a home position, an A.C. source of power supply, a rectifier means for providing a D.C. source of power supply, a first electrical control element, a switch means for connecting said first control element to said D.C. source of supply to effect energization of said first control element in the first half of the initial A.C. cycle, a locking circuit including a condenser operable to maintain said first control element in an energized state, a second electrical control element energized in the second half of the initial A.C. cycle under control of said first control element upon energization thereof and operable to control sequential pulsing of said stepping coil by said A.C. source of supply in the first half of each of the succeeding A.C. cycles to move said wiper to the home position, said second control element being operable upon energization thereof to effect de-energization of said first control element in the first half of the second A.C. cycle, a holding circuit enabled by said first control element upon de-energization thereof to maintain said second control element in an energized state until said wiper reaches home position, and means controlled by said wiper upon reaching home position operable in the second half of the last homing A.C. cycle to effect de-energization of said second control element.

5. In a combination with a stepping switch, a wiper on said stepping switch, a stepping coil for moving said wiper step-by-step from a selected predetermined position to a home position, an A.C. source of power supply, a first relay and a second relay, a switch means for controlling energization of said first relay in a predetermined portion of the initial A.C. cycle, means controlled by said first relay upon energization thereof to effect energization of said second relay in the opposite portion of the initial A.C. cycle, circuit control means enabled by said second relay upon energization thereof to effect de-energization of said first relay and to connect said stepping coil with said A.C. source of supply for the pulsing of said stepping coil to move said wiper toward the home position in the portion of each succeeding A.C. cycle corresponding to the said predetermined portion of the initial A.C. cycle, a locking circuit for said second relay enabled by said controlled means upon de-energization of said first relay means, and an operation terminating circuit completed by said wiper upon return of said wiper to home position whereby said second relay is de-energized in the portion of the last A.C. cycle opposed to the said predetermined portion of the initial A.C. cycle.

References Cited by the Examiner

UNITED STATES PATENTS

| | | | |
|---|---|---|---|
| 2,522,705 | 9/1950 | Dewar | 317—142 |
| 2,877,444 | 3/1959 | Hawley | 307—141 X |
| 2,968,747 | 1/1961 | Shillingten | 317—139 |
| 3,019,356 | 1/1962 | Tepolt et al. | 307—132 |
| 3,070,710 | 12/1962 | Zarleng | 307—112 |

LLOYD McCOLLUM, *Primary Examiner.*

UNITED STATES PATENT OFFICE
CERTIFICATE OF CORRECTION

Patent No. 3,229,125                      January 11, 1966

David J. Deeks

It is hereby certified that error appears in the above numbered patent requiring correction and that the said Letters Patent should read as corrected below.

In the grant, line 1, and in the heading to the printed specification, line 3, for "Alameda", each occurrence, read -- Hayward --; column 2, line 14, after "coil" insert -- of --; column 3, line 36, for "36" read -- 26 --; line 53, for "bove" read -- above --; line 66, for "22" read -- 122 --; column 5, line 10, for "base" read -- based --.

Signed and sealed this 29th day of November 1966.

(SEAL)
Attest:

ERNEST W. SWIDER                      EDWARD J. BRENNER
Attesting Officer                        Commissioner of Patents